United States Patent [19]
Puskas

[11] Patent Number: 4,730,796
[45] Date of Patent: Mar. 15, 1988

[54] CANOPY LOADING SYSTEM FOR RAM AIR PARACHUTES

[75] Inventor: Elek Puskas, Mount Holly, N.J.

[73] Assignee: Para-Flite, Inc., Pennsauken, N.J.

[21] Appl. No.: 5,305

[22] Filed: Jan. 20, 1987

Related U.S. Application Data

[63] Continuation of Ser. No. 503,883, Jun. 10, 1983, abandoned, which is a continuation of Ser. No. 815,789, Jan. 3, 1986, abandoned.

[51] Int. Cl.⁴ ............................................. B64D 17/24
[52] U.S. Cl. ................................................... 244/142
[58] Field of Search .............. 244/DIG. 1.3, 142, 145, 244/151 R, 151 A, 151 B, 152, 153 R

[56] References Cited

U.S. PATENT DOCUMENTS

| Re. 26,427 | 7/1968 | Jalbert | 244/142 |
|---|---|---|---|
| 3,252,676 | 5/1966 | Frieder | 244/145 |
| 3,498,565 | 3/1970 | Nash-Boulden | 244/152 |
| 3,642,237 | 2/1972 | Hulteen | 244/152 |
| 3,700,191 | 10/1972 | Page | 244/142 |
| 3,944,169 | 3/1976 | Bede | 244/142 |
| 4,399,969 | 8/1983 | Gargano | 244/145 |

FOREIGN PATENT DOCUMENTS 1181279  2/1970  United Kingdom ................ 244/142

Primary Examiner—Joseph F. Peters, Jr.
Assistant Examiner—Rodney Corl
Attorney, Agent, or Firm—Fleit, Jacobson, Cohn & Price

[57] ABSTRACT

An airfoil-shaped canopy of a ram air inflated parachute has load point attachments spaced chordwise along all of the ribs which internally separate the inflating air cells. Each load suspension line extending from a payload riser is connected through a load distributing system to at least four canopy load points consisting of a chordwise spaced pair and a spanwise spaced pair of attachments to the canopy.

8 Claims, 4 Drawing Figures

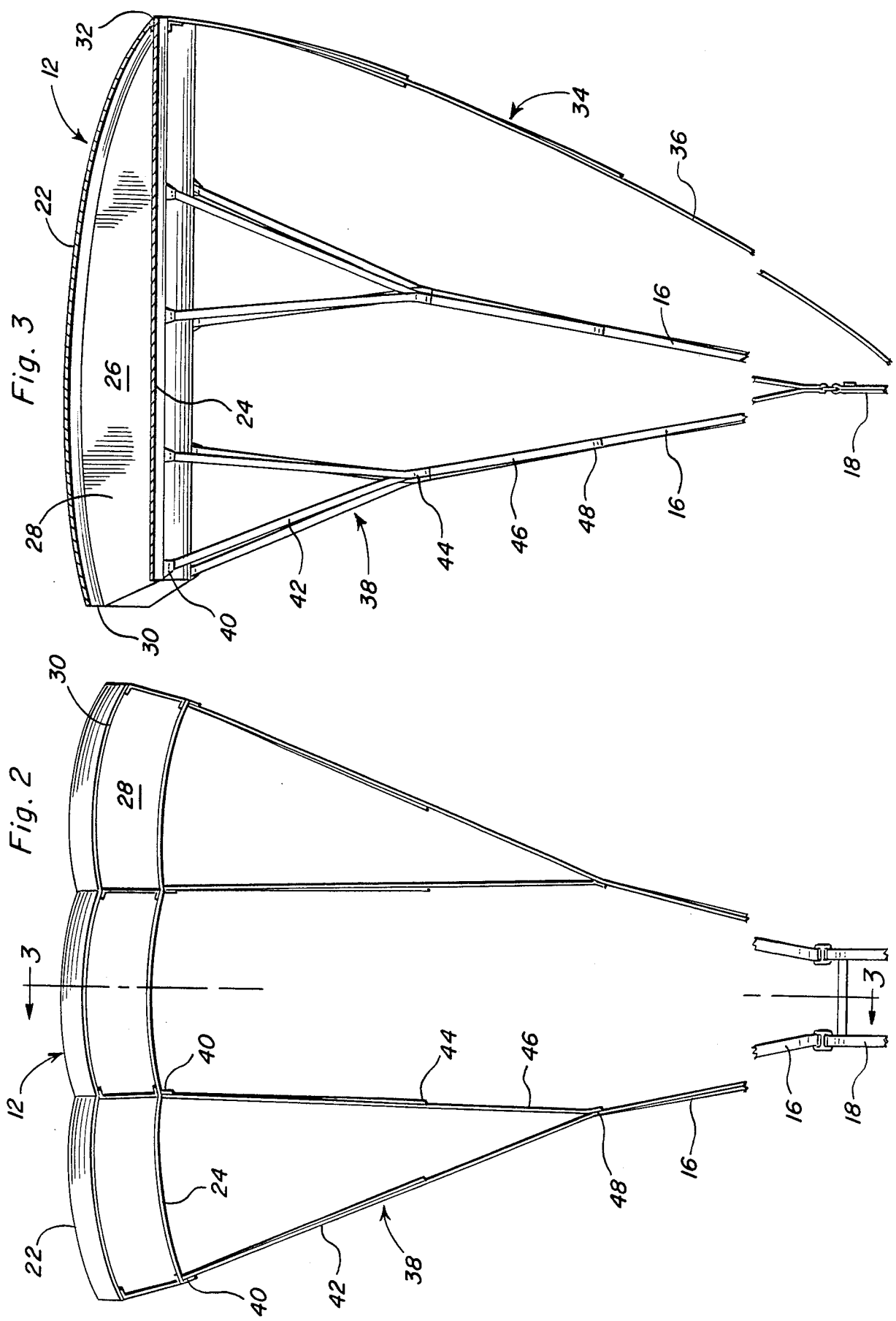

CANOPY LOADING SYSTEM FOR RAM AIR PARACHUTES

This application is a continuation of application Ser. No. 503,883, filed June 10, 1983, which is a continuation of application Ser. No. 815,789, filed Jan. 3, 1986, both now abandoned.

BACKGROUND OF THE INVENTION

This invention relates to forward gliding ram-air inflated canopy parachutes of the type disclosed in U.S. Pat. No. 3,724,789 to Snyder, and more particularly to a load distributing system for the canopy of such parachutes.

Ram air inflated parachutes of the foregoing type have an airfoil-shaped canopy, the foward glide and load carrying characteristics of which depend on the maintenance of a relatively high lift/drag ratio which is adversely affected by distortion of the outer canopy surfaces from the ideal airfoil curvatures and by the drag of the load lines through which the payload is suspended from the canopy. From experience, a canopy of a given size has been provided with an optimum number of load lines attached to the canopy at chordwise spaced load points designed to establish inflated canopy surfaces with acceptable distortion from the ideal airfoil lift curvature. Although less distortion from the ideal airfoil surface occurs with the use of more load lines, the drag is also increased so that some compromise is necessary.

It has also been found advisable to locate the chordwise spaced load point attachments of the load lines to the bottom surface of the canopy along the ribs which internally separate the canopy inflating air cells. Such air cells extend chordwise from the open intake at the leading edge of the canopy to the trailing edge. Thus, distortion from the ideal airfoil surface will occur along those ribs at which the load points are located. To minimize the number of load lines utilized and the drag associated therewith, heretofore some of the rib locations on the bottom canopy surface are free of load point attachments. In this manner, a predetermined lift/drag ratio is achieved for the desired forward glide characteristic of any given size canopy and associated payload capacity.

It is therefore an important object of the present invention to provide a ram-air inflated, forward glide parachute having an unexpectedly large payload capacity.

Another object in accordance the foregoing object is to provide the ram air inflated parachute with an improved airfoil lift surface so as to maintain forward glide characteristics for larger payloads.

Yet another object of the invention is to provide a ram air inflated parachute with more than what was heretofore believed to be an optimum number of load lines in order to more reliably suspend heavier payloads.

SUMMARY OF THE INVENTION

In accordance with the present invention, canopy loading of a ram air inflated parachute of the type disclosed in U.S. Pat. No. 3,724,789, aforementioned, is applied to all of the air cell dividing ribs including the outer ribs or side panels of the canopy. Although the number of load suspension lines is thereby increased, such increase is minimized by use of a load distributing system through which loading is more evenly distributed amongst chordwise spaced load point attachments to the bottom surface of the canopy aligned along each of the ribs. Such distribution of loading is preferably limited to canopies designed with an even number of ribs or an odd number of air cells.

The load distribution system includes a first set of flexible force transmitting suspension branch lines secured at their upper ends directly to the canopy by each of the aforementioned load point attachments. Adjacent pairs of these branch lines, spaced chordwise according to one embodiment, are secured to each other at their lower ends by branch junctions spaced a predetermined distance below the inflated canopy. A second set of force-transmitting, suspension branch lines are secured at their upper ends of the aforementioned junctions. Adjacent pairs of spanwise spaced branch lines of the second set are interconnected at their lower ends to primary load lines by junctions spaced further below the canopy according to said one embodiment. The primary load lines are connected as usual by a pair of risers to the payload harness.

As a result of the foregoing load distributing arrangement, each load line is connected to at least four canopy load point attachments. The chordwise spacing between such attachments and their locations along all of the ribs accounts for less deviation from the ideal chordwise airfoil curvature because of less load per canopy attachment to effect an aerodynamic improvement. A wider spanwise dimension for the canopy when inflated is achieved because of less spanwise distortion as a result of closer spanwise spacing of the canopy attachment points. The spanwise wider inflated canopy and the increased number of load lines provides a larger payload capacity. Forward glide at the glide lift/drag ratio despite the increased drag of more load lines should be maintained because of the improved aerodynamics of a canopy surface.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a front elevation view of the parachute shown in FIG. 1 in an inflated airborne condition.

FIG. 3 is a partial side sectional view taken substantially through a plane indicated by section line 3—3 in FIG. 2.

DETAILED DESCRIPTION OF PREFERRED EMBODIMENT

Figure 1:
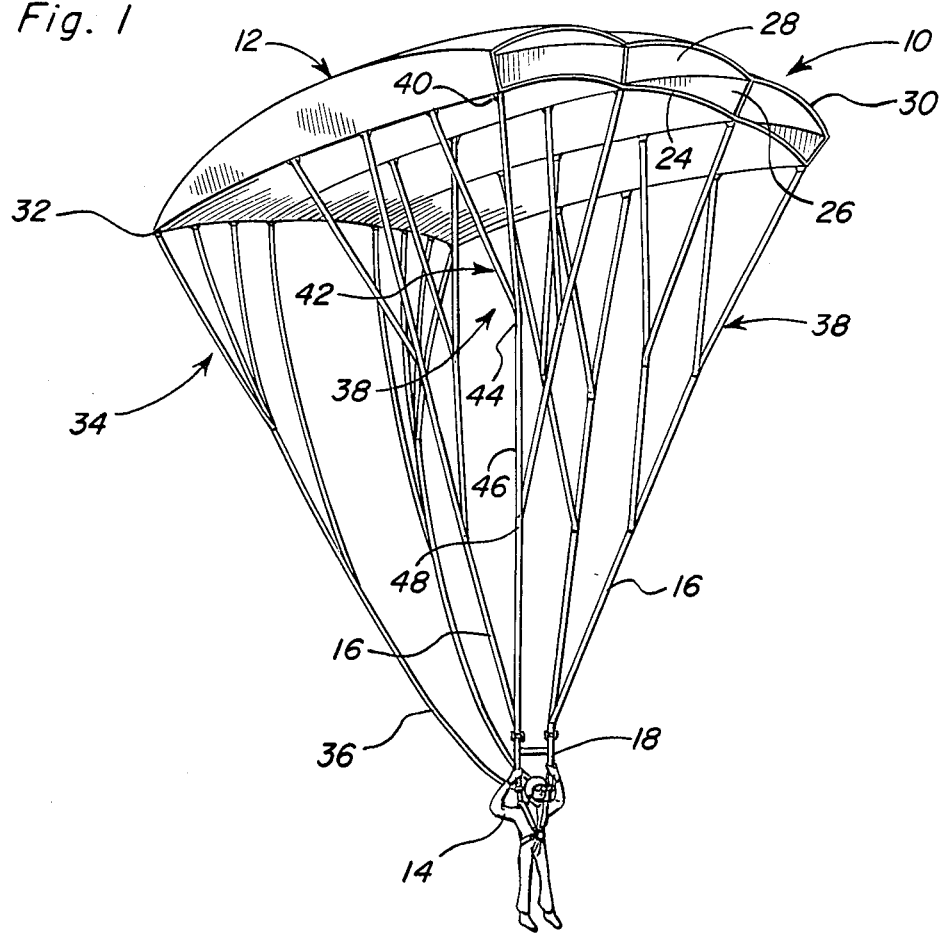
FIG. 1 is a perspective view of a ram air inflated forward glide parachute embodying the canopy load distribution system of the present invention.
Figure 4:
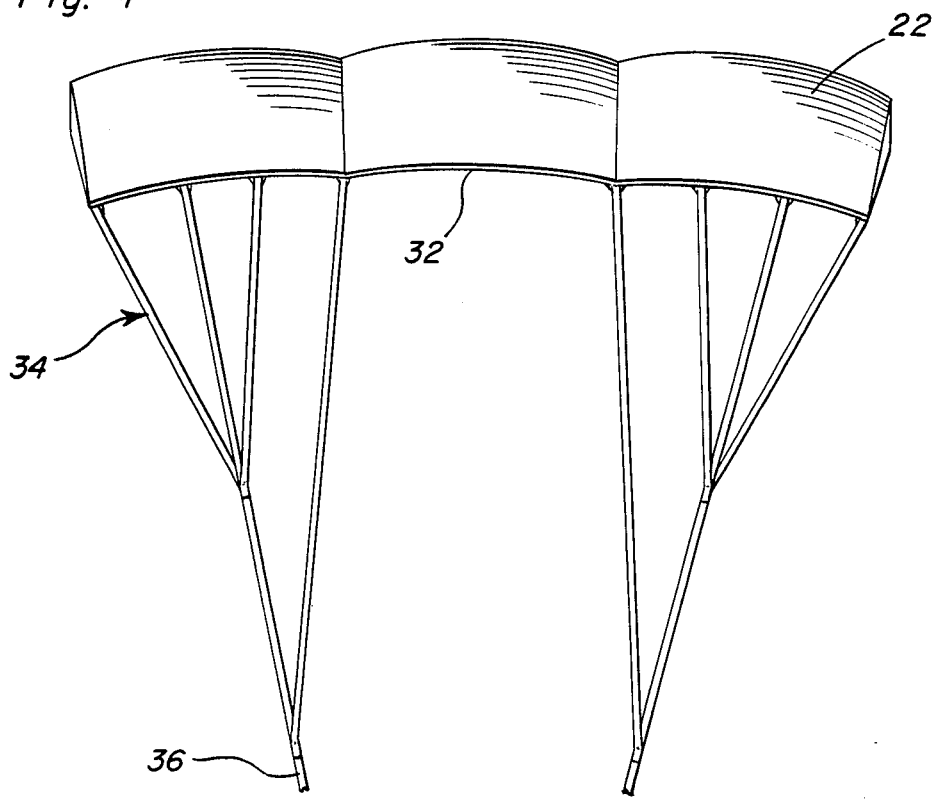
FIG. 4 is a partial rear elevelational view of the parachute shown in FIGS. 1–3.

Referring now to the drawings in detail, a ram air inflated, airfoil gliding type of parachute is shown, generally denoted by reference numeral 10. The parachute includes a flexible canopy 12 that is airfoil shaped when inflated. A payload 14 is shown suspended from the fully inflated canopy in FIG. 1 by a plurality of load suspension lines 16 connected through a pair of spanwise spaced risers 18 to the payload harness 20.

The canopy 12 includes a top panel surface portion 22 and a bottom panel surface portion 24 interconnected by a plurality of spanwise spaced ribs 26 which separate a plurality of air cells 28. The air cells extend chordwise of the canopy from an air intake opening at the leading edge portion 30 of the canopy to a trailing edge 32 through which the canopy is exclusively inflated by ram air pressure as shown. At opposite spanwise end portions of the trailing edge, an array of connecting lines 34 connect the trailing edge to a pair of aerodynamic steering control lines 36.

The foregoing parachute 10 is generally well known, including its construction and operation. However, in accordance with the present invention, primary load suspension lines 16 are operatively connected to the canopy 12 by a load distributing system generally referred to by reference numeral 38 through which the canopy in its fully inflated airborne condition is loaded at a plurality of spaced load points on the bottom surface portion 24 along all of the ribs to establish the curvatures for the upper and lower surface portions 22 and 24 as shown. The load distributing system is preferably limited to a canopy having an even number of ribs 26 or an odd number air cells in order to more evenly distribute the payload loading along all ribs.

The load distributing system includes canopy load attachment means 40 of conventional or suitable form at each of the load points on the bottom portion of the canopy through which a plurality of flexible suspension branch lines 42 are directly connected to the canopy. Pairs of adjacent, chordwise-spaced upper branch lines 42 are interconnected by upper branch junctions 44 spaced a predetermined distance below the airborne canopy. A second set of suspension branch lines 46 are provided, and adjacent, spanwise spaced pairs of such intermediate branch lines 46 are interconnected directly with the primary load suspension lines 16 by junctions 48 at locations spaced below the junctions 44 in the illustrated embodiment. The junctions 44 and 48 are formed by Nylon thread, for example. The branch lines 46 thus transmit loading between the primary load lines 16 and the junctions 44 to spanwise spaced locations on the canopy. The branch lines 42 and 46 may be made somewhat lighter than the load lines 16 since the load per branch line is reduced.

It will be apparent from the foregoing description that each load line 16 is connected by the load distribution system 38 to at least four load points by attachment means 40 on the canopy, thereby minimizing the increase in number of suspension lines to a value less than the increase in number of load points resulting from the loading of the canopy along all of the ribs. Nevertheless, an even distribution of loading amongst the increased number of load points on the canopy is achieved so as to reduce deviations of the canopy surface from the ideal chordwise airfoil curvature and also widen the spanwise width of the inflated canopy by reduced spanwise deviation. In view of such airfoil surface improvement and increase in spanwise width, the load capacity of a parachute 10 of a given dimension is increased above the heretofore expected amount. It is also believed that despite the increase in the number of load suspension lines associated with parachute 10 and the accompanied increased drag, as compared to parachutes of the same general type and dimension, the same lift/drag ratio is obtained because of the improved airfoil surface condition. Also, with the increased number of load lines, the load per line directly attached to the canopy is reduced so that cross-sectionally smaller lines may be utilized to minimize drag.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A ram air parachute comprising:
   (a) a flexible canopy having an airfoil shape which includes:
      (i) a top surface having a leading edge;
      (ii) a bottom surface; and
      (iii) an even number of spanwise spaced ribs extending between the top and bottom surfaces to divide the canopy into an uneven number of side-by-side chordwise extending cells having openings at the leading edge through which the cells are inflated by ram air pressure,
   (b) a load suspension system connected to all of the ribs including:
      (i) a plurality of primary suspension lines having upper and lower junctions;
      (ii) branch suspension means respectively connected to the upper junction of each of the primary suspension lines and extending therefrom in spanwise and chordwise diverging relation toward locations on the bottom surface to which spanwise spaced adjacent pairs of the ribs are connected; and
      (iii) attachment means for connecting the branch suspension means to the bottom surface adjacent to said locations thereon;
   (c) a payload harness; and
   (d) a pair of spaced risers connecting the lower junctions of the primary suspension lines to said payload harness.

2. A ram air parachute in accordance with claim 1 wherein said primary suspension lines are substantially longer than said branch suspension means.

3. The ram air parachute of claim 1 wherein each of said branch suspension means divides longitudinally into at least two chordwise diverging sections attached to the bottom surface by the attachment means at those of the locations spaced chordwise along the ribs.

4. The ram air parachute of claim 1 wherein each of said branch suspension means comprises a pair of suspension branch lines of substantially equal length connected directly to the bottom surface by the attachment means.

5. A ram air inflated parachute according to claim 1, wherein said cells are exclusively inflated by the ram air pressure establishing curvatures along the top and bottom surfaces of the canopy with minimized distortion from an ideal airfoil shape and minimal drag from the primary suspension lines.

6. A ram air inflated parachute having an airfoil shape and made of flexible material which comprises:
   an upper surface, a lower surface and spanwise spaced ribs sewn to and extending between the upper surface and the lower surface to divide the canopy into an uneven number of side-by-side chordwise extending cells;
   a load suspension system connected to all of the ribs including a plurality of primary suspension lines having upper and lower ends, four (4) branch lines connected to the upper end of each of the primary suspension lines and means for attaching each of the four (4) branch lines to spanwise and chordwise spaced locations on the lower surface; and a pair of spaced risers connected to the lower ends of said primary suspension lines.

7. A ram air inflated parachute in accordance with claim 6 wherein each set of the four branch lines includes a pair of lines connected to the lower surface at an adjacent pair of said ribs.

8. A ram air inflated parachute according to claim 6, wherein said cells are exclusively inflated throughout by ram air pressure establishing curvatures along the upper and lower surfaces with minimized distortion from an ideal airfoil shape of the canopy and minimal drag from the primary suspension lines.

* * * * *